United States Patent [19]

Tonelli

[11] Patent Number: 4,744,575
[45] Date of Patent: May 17, 1988

[54] COASTER WAGON WITH ANTI-TIPPING FEATURES

[75] Inventor: Roger Tonelli, Elmwood Park, Ill.

[73] Assignee: Radio Steel & Mfg. Co., Chicago, Ill.

[21] Appl. No.: 880,188

[22] Filed: Jun. 30, 1986

[51] Int. Cl.<sup>4</sup> .............................................. B62B 9/02
[52] U.S. Cl. ................................................. 280/87.01
[58] Field of Search .................... 280/87.01, 772, 272, 280/267, 87.02 R, 432

[56] References Cited

U.S. PATENT DOCUMENTS

| | | | |
|---|---|---|---|
| 2,027,522 | 1/1936 | Eck | 280/87.01 |
| 2,400,738 | 5/1946 | Brown | 280/432 |
| 2,481,114 | 9/1949 | Hayhurst | 280/87.01 |
| 2,959,429 | 11/1960 | Lavelle | 280/432 |
| 4,222,582 | 9/1980 | Tonelli | 280/87.02 R |
| 4,261,588 | 4/1981 | Kassai | 280/272 X |
| 4,556,232 | 12/1985 | Sever | 280/432 |

Primary Examiner—John J. Love
Assistant Examiner—Michael Mar
Attorney, Agent, or Firm—Jones, Day, Reavis & Pogue

[57] ABSTRACT

A coaster wagon having an anti-tipping feature which hinders the free rotational movement of the steering mechanism thereby preventing sharp turns while substantially reducing the likelihood that the wagon will tip over during a turn.

4 Claims, 2 Drawing Sheets

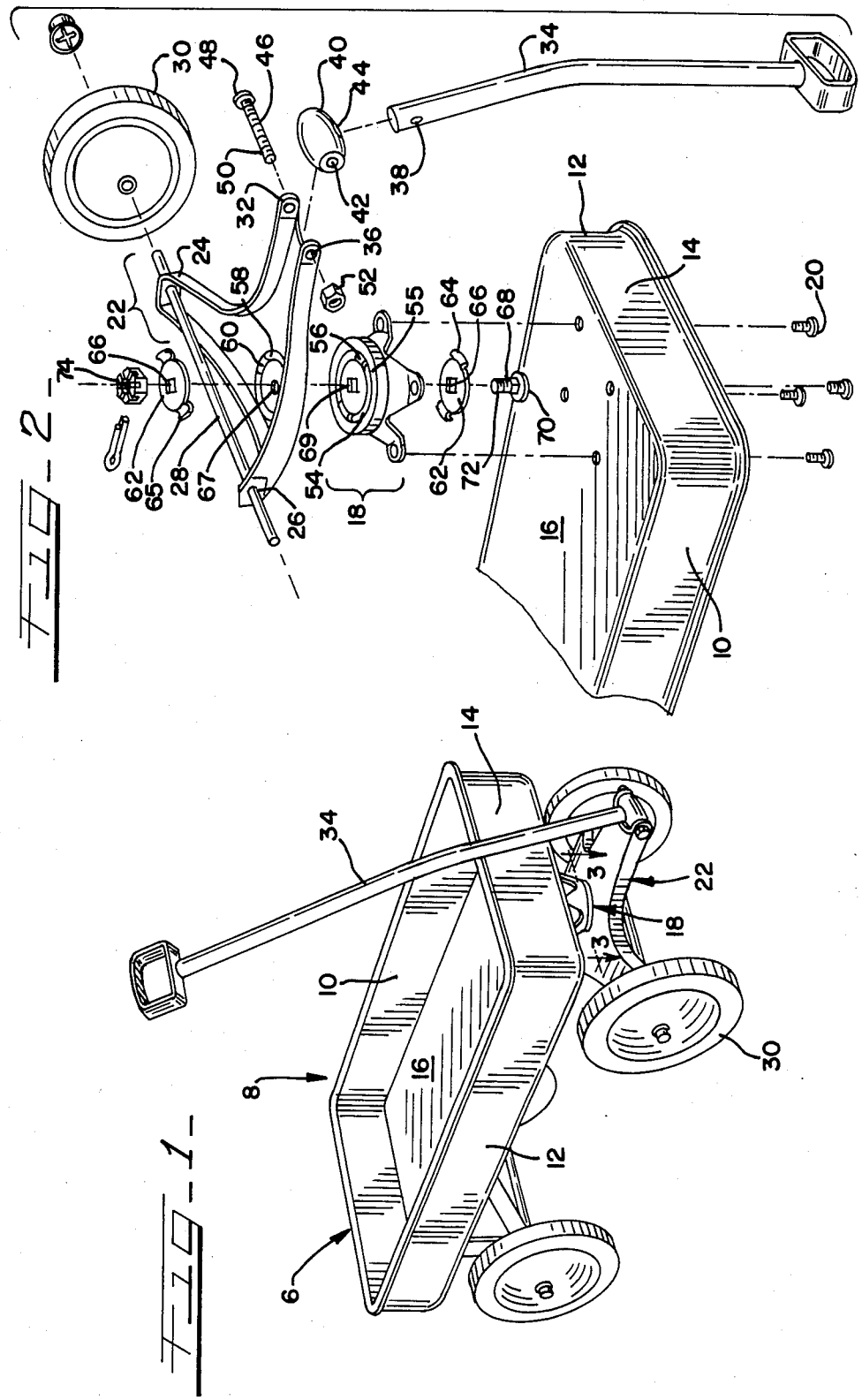

COASTER WAGON WITH ANTI-TIPPING FEATURES

BACKGROUND OF THE INVENTION

This invention relates to coaster wagons and to an element employed therein.

To date, coaster wagons have been constructed with a steering assembly mounted for rotational movement on a turntable fixed to the bottom side of the wagon body. The steering assembly extends forwardly from the wagon body, and a handle is pivotally connected to a forward portion of said assembly. The mounting of the steering assembly has been by way of positioning a circularly grooved portion of the uppermost surface of the steering assembly to accommodate a similarly grooved portion on a turntable mounted to the bottom of the wagon body. Openings in the assembly and in the turntable are thereby aligned, and the assembly and turntable are pivotally secured by a bolt inserted through the aligned openings allowing free rotational movement of the assembly about the vertical axis of the connecting bolt.

This assembly allows the wagon to be steered via the front wheels which are mounted for free rotational movement on the ends of an axle which extends crosswise from the steering assembly. Tonelli, et al. U.S. Pat. No. 4,222,582 provides a description of a wagon having such a steering mechanism.

The free rotational movement of the steering assembly has been a source of danger because the wagon will tip over if pressure is applied to the front end during a sharp turn. The pressure created by the weight of a child is often sufficient to cause tipping. Considerable thought has been given to redesign of the coaster wagon with a view to reducing the likelihood of injury due to tipping.

Therefore, it is an object of this invention to provide a simple and effective solution to the problems raised by coaster wagons of previous designs.

It is another object of this invention to reduce the likelihood of tipping caused by sharp turning of the steering assembly.

These and other objects and advantages of this invention will become apparent from the remaining portions of the specification.

BRIEF DESCRIPTION OF THE DRAWINGS

FIG. 1 is a perspective view of a coaster wagon according to an embodiment of the invention;

FIG. 2 is a perspective view showing the relationship of parts for assembly of an embodiment of the invention;

DETAILED DESCRIPTION

Figure 3:
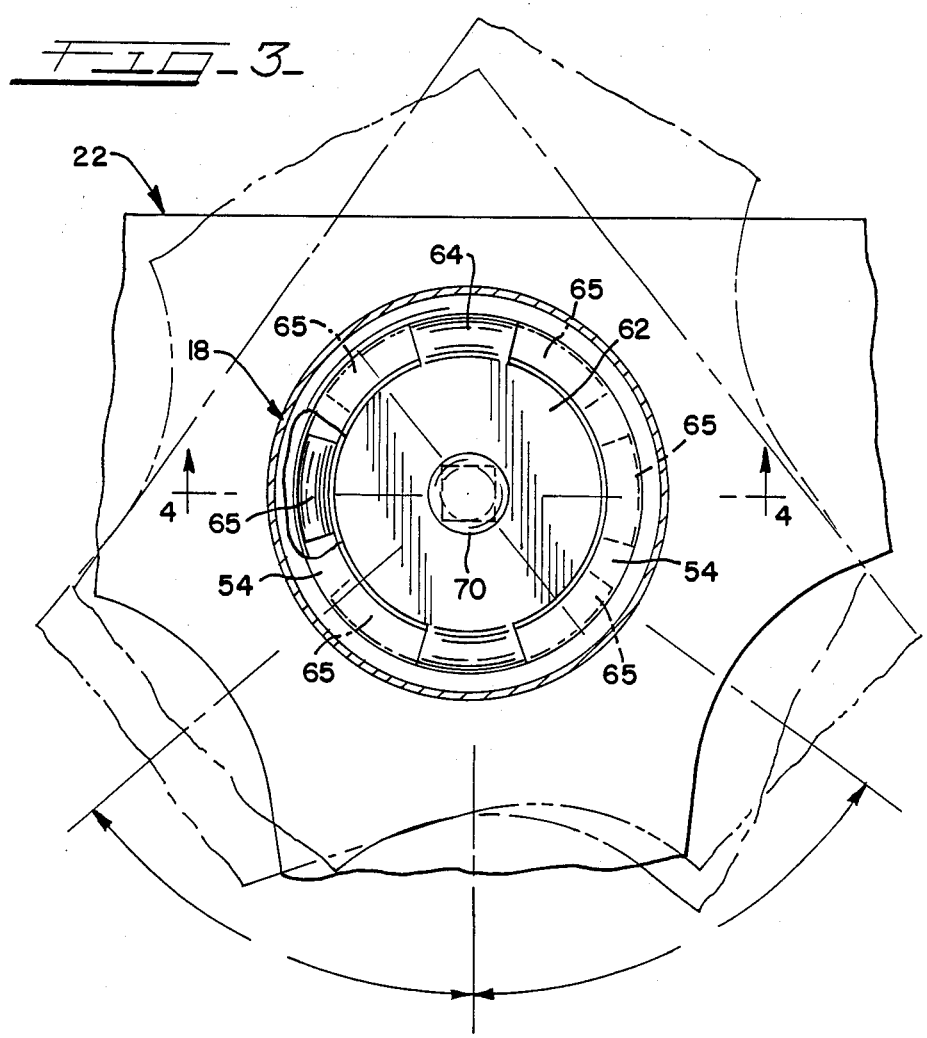
FIG. 3 is a enlarged, cross-sectional fragmentary view of the connecting relationship of the turntable and the steering assembly taken along the line 3—3 of FIG. 1; and, FIG. 4 is a cross-sectional view of the connecting relationship of the turntable and the steering assembly taken along the line 4—4 of FIG. 3.

Referring to FIGS. 1 and 2, the general layout of the coaster wagon 8 of the present invention is illustrated, this layout being essentially as described in the aforementioned U.S. Pat. No. 4,222,582. Referring to FIG. 2, illustration is made, bottom side up, of the front end portions of a coaster wagon having side walls 10 and 12, front end wall 14, and bottom 16. A turntable 18 is secured by screws 20 to the underside of the bottom 16 for mounting a steering assembly for rotational movement about a vertical axis relative thereto.

The steering assembly 22 is provided with laterally spaced-apart depending flanged portions 24 having crosswise aligned openings 26 through which a front axle 28 extends for mounting wheels 30 for free rotation on the end portions of the axle 28. The forward end portion of the steering assembly 22 extends beyond the front end wall 14 and below the bottom 16 with a pair of laterally spaced-apart tabs 32 extending forwardly as a yoke between which the handle 34 is mounted. The tabs 32 are provided with crosswise aligned openings 36, and the end portion of the handle 34 is similarly provided with crosswise extending openings 38. A tubular member 40, preferably of elliptical shape, is provided with a passage 42 extending axially therethrough. Another passage 44 is formed midway between the ends of the tubular member 40 and extends radially into said member beyond the axis of passage 42 by the distance from the end of the handle 34 to the passage 38 extending therethrough.

The end of the handle 34 is inserted into passage 44 so that the crosswise extending openings 38 in the handle 34 are aligned with the axial passage 42 in the tubular member 40. The handle 34 and the tubular member 40 are pivotally secured to tabs 32 by a fastening bolt 46 extending through the crosswise aligned openings 36, the crosswise extending openings 38 and the axially extending passage 42. The fastening bolt 46 is formed with a head 48 at one end dimensioned to be larger than the openings 36 and a threaded portion 50 on the through-extending portion for threaded engagement by a fastening nut 52.

In accordance with the practice of this invention, the steering assembly 22 is mounted to the turntable 18 so that rotational movement of the steering assembly 22 is hindered at two positions in the plane of rotation. An inwardly (toward the bottom 16) grooved circular track 54 is provided within the turntable surface 55, having a diameter slightly less than the diameter of said turntable surface 55. Two diametrically opposed stops 56 are formed in the circular track 54 by stamping in the opposite direction in these areas. These stops are oriented so that when the turntable 18 is secured to the bottom 16, one of the stops is positioned adjacent front end wall 14.

A similarly configured circular track 58 is provided on the rearmost upper surface of the steering assembly 22 in a position generally centrally of the laterally spaced depending flanged portions 24. The track 58 is formed outwardly (away from bottom 16), and two diametrically opposed stops 60 are also formed in the track 58. These stops 60 are oriented within the circular track 58 so that both stops 60 are equidistant from the frontmost portion of the steering assembly 22 and are laterally positioned within said circular track 58. Accordingly, a line connecting the mid-point on the stops 60 would be at right angles to a line connecting the midpoints of the stops 56.

In accordance with the practice of the invention, the steering assembly 22 is mounted on the turntable 18, forming a pair of tunnels, or enclosed tracks, by the joining of the circularly grooved tracks 54 and 58. Two identical washers 62 are provided for assembly purposes, and in mounting the steering assembly 22 to turntable 18, one of the washers 62 is mounted on the surface of the turntable 18 which faces the bottom 16.

Diametrically opposed curved flanged portions 64 of the washer protrude downwardly (FIG. 4) for interfitting with the stops 56.

The second washer 62 is placed on the bottom of the steering assembly 22 and diametrically opposed flanged portions 65 protrude upwardly for interfitting with the stops 60. Axially aligned center holes 66, 67 and 69 are provided, respectively, in the washers 62, the steering assembly 22, and the turntable 18. The steering assembly 22 and washers 62 are secured to the turntable 18 by a fastening bolt 68 extending through the washers 62, turntable 18 and steering assembly 22. The fastening bolt is formed with a head 70 at one end dimensioned to be larger than the axially aligned holes 66. A threaded portion 72 on the through extending portion of the bolt is supplied for threaded engagement by a fastening nut 74.

Referring now to FIG. 3, the connecting relationship between the steering assembly 22 and the turntable 18 is illustrated looking downwardly along the vertical axis of the connecting bolt. By securing the turntable 18 to the bottom 16, the positions of the downwardly protruding flanged portions 64 of washer 62 are fixed along a horizontal axis extending from the front of the wagon to the rear. The positions of the upwardly protruding flanged portions 65, affixed to steering assembly 22, are pivotally movable by rotation of the steering assembly 22 about the vertical axis of the connecting bolt 68. The limits of movement of the flanged portions 65, as well as the middle locations thereof, are shown in phantom in FIG. 3.

In accordance with the practice of this invention, the rotation of the steering assembly around the connecting bolt 68 is hindered by the rotational interaction of the downwardly protruding stops 56 of the turntable with the upwardly protruding stops 60 of the steering assembly. The respective flanged portions 64 and 65, which interfit with the stops, reinforce this blocking action.

More specifically, the stops 56, and the downward flanged portions 64 stop the rotational movement of the steering assembly 22 by blocking the rotational movement of the stops 60 and upward flanged portions 65 when the steering assembly is turned approximately 45 degrees to the right or the left, as measured by the displacement of a horizontal line extending from the fastening bolt 68 to a point directly between the laterally spaced-apart tabs 32.

Figure 4:
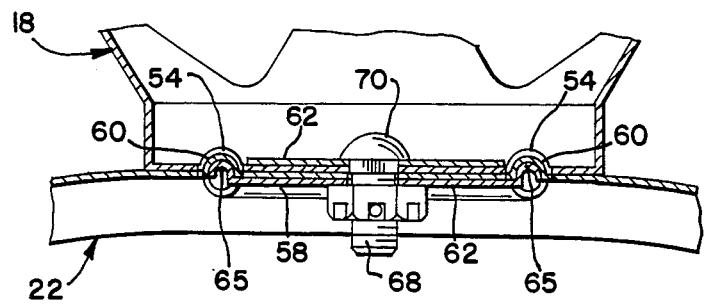

Referring now to FIG. 4, a bisecting front view of the connecting relationship is shown. The stops 60 and the upwardly protruding flanged portions 65 are shown within a tunnel or enclosed track which is formed by joining the circular tracks 54 and 58. The stops 60 and upward flanged portions rotate with the steering assembly 22 around the fastening bolt 68.

It will be appreciated that with or without flanged portions on the washers, the objects of the invention can be achieved with single stops on the turntable and steering assembly. As with the washer design, the provision of a pair of stops ensures reliable and efficient performance.

The identical washers 62 with diametrically opposed flanged portions should be made out of a metallic material, preferably steel, in order to insure maximum reinforcement and stability. The remainder of the steering assembly and the turntable can be made of any durable material, preferably a metallic material, which possesses the requisite strength to support the weight of the coaster wagon with a reasonable amount of extra payload.

By hindering the rotational movement of the steering assembly in the fashion shown, the likelihood of tipping the coaster wagon during a sharp turn is greatly reduced. It will be understood that changes may be made in the details of construction, arrangement and operation without departing from the spirit of the invention, especially as defined in the following claims.

That which is claimed is:

1. A coaster wagon with an anti-tipping feature which blocks the free rotation of the sterring mechanism to reduce the likelihood of tipping by preventing sharp turns, comprising:

a turntable rigidly affixed to the bottom of the coaster wagon for securing a steering assembly thereto, said turntable defining a surface which is parallel to the bottom of said wagon, said surface having an upwardly grooved circular portion and an opening in the center of said surface for pivotal connection to a steering assembly;

a steering assembly having laterally spaced-apart depending flanged portions, said flanged portions having cross-wise aligned openings through which a front axle extends for mounting wheels; a forward end portion having a pair of latterally spaced-apart tabs, said tabs extending forwardly and being provided with cross-wise aligned openings for pivotal attachment to a handle; a downwardly grooved circular portion located generally midway between said lateral flanged portions, and including an opening in the center of said grooved portion for pivotal connection to the turntable;

means pivotally securing the steering assembly to the turntable for steering the coaster wagon;

stop means formed at diametrically opposed locations on each of said turntable and said steering assembly, said turntable stop means comprising downwardly grooved portions formed within said upwardly grooved circular portion of said turntable, said turntable and said steering assembly stop means comprising upwardly grooved portions formed within said downwardly grooved circular portion of said steering assembly and steering assembly stop means blocking pivotal movement of the steering assembly beyond a predetermined degree whereby the coaster wagon cannot be turned sharply to either side thereby reducing the chance of tipping the wagon.

2. The device of claim 1 including a pair of washers, one washer overlying said turntable on the side of the turntable opposite the side facing said steering assembly, said one washer defining flange means interfitting with said turntable stop means, and the other washer overlying said steering assembly on the side of the steering assembly opposite the side facing said turntable, said other washer defining flange means interfitting with said steering assembly stop means, said washers reinforcing the blocking of free rotation.

3. The device of claim 2 wherein said pair of washers comprise a flat circular center portion with a center hole and two diametrically opposed curved flanged portions; said washers, turntable and steering assembly being held together by a connecting bolt and nut for pivotal rotation of the steering assembly around the vertical axis of said connecting bolt.

4. The device of claim 3 wherein said grooved portions of the steering assembly and the turntable form a tunnel into which said flange means of said washers protrude so that the pivotal rotation of the steering assembly is hindered by the combined interaction between the turntable and steering assembly stop means and flange means, said interaction preventing the sterring assembly from being turned more than approximately 45 degrees.

* * * * *